United States Patent
Schuch

(10) Patent No.: US 8,508,155 B2
(45) Date of Patent: Aug. 13, 2013

(54) SYSTEM AND METHOD FOR CALIBRATING BACKLIGHT DEVICES

(75) Inventor: John Schuch, Buford, GA (US)

(73) Assignee: Manufacturing Resources International, Inc., Alpharetta, GA (US)

( * ) Notice: Subject to any disclaimer, the term of this patent is extended or adjusted under 35 U.S.C. 154(b) by 246 days.

(21) Appl. No.: 13/081,111

(22) Filed: Apr. 6, 2011

(65) Prior Publication Data
US 2012/0086344 A1    Apr. 12, 2012

Related U.S. Application Data

(60) Provisional application No. 61/324,141, filed on Apr. 14, 2010.

(51) Int. Cl.
*G05F 1/00* (2006.01)
*H05B 37/02* (2006.01)
*H05B 39/04* (2006.01)
*H05B 41/36* (2006.01)

(52) U.S. Cl.
USPC ............ 315/307; 315/158; 315/291; 315/308

(58) Field of Classification Search
None
See application file for complete search history.

(56) References Cited

U.S. PATENT DOCUMENTS

| | | | |
|---|---|---|---|
| 7,176,640 B2 * | 2/2007 | Tagawa | 315/308 |
| 8,125,163 B2 * | 2/2012 | Dunn et al. | 315/307 |
| 2005/0231457 A1 | 10/2005 | Yamamoto | |
| 2006/0049533 A1 * | 3/2006 | Kamoshita | 264/1.7 |
| 2008/0055297 A1 * | 3/2008 | Park | 345/205 |

FOREIGN PATENT DOCUMENTS

| | | |
|---|---|---|
| JP | 2000-122575 A | 4/2000 |
| WO | 2008-050402 A1 | 5/2008 |

* cited by examiner

*Primary Examiner* — Anh Tran
(74) *Attorney, Agent, or Firm* — Standley Law Group LLP

(57) ABSTRACT

A system and method for controlling the backlight of a liquid crystal display (LCD) to account for ambient light penetration through the LCD stack and into the backlight cavity. A first light sensing device may be placed to measure the ambient light while a second light sensing device may be placed within the backlight cavity to measure the backlight luminance. A desired display luminance (based on the ambient light) can be converted to a desired backlight luminance. A software driver or microprocessor may drive the LCD backlight to meet the desired backlight luminance. A calibration can be performed to create and store correction factors for the second light sensing device when high ambient light levels create disruptions in the data for the second light sensing device. The correction factors may be used to accurately control the backlight levels and may be based upon incoming data from the first light sensing device.

20 Claims, 6 Drawing Sheets

SYSTEM AND METHOD FOR CALIBRATING BACKLIGHT DEVICES

CROSS-REFERENCE TO RELATED APPLICATIONS

This application claims priority to U.S. application No. 61/324,141 filed on Apr. 14, 2010, herein incorporated by reference in its entirety.

TECHNICAL FIELD

This invention generally relates to electronic display sensor systems and in particular to a system and method for calibrating backlight systems for static displays and/or liquid crystal displays (LCDs) which may be used outdoors and/or in direct sunlight.

BACKGROUND OF THE ART

Traditionally, advanced electronic display systems have only been used for indoor applications or outdoor applications where the variation in temperature and/or amount of direct sunlight is limited. When these systems are moved outside and/or into direct sunlight, both elements become significant factors in the display's ability to accurately create a viewable image.

Bright ambient environments and/or direct sunlight can limit the visibility of the display, as the reflection of the ambient light rays off a display surface may be brighter than the light which is generated by the display. Past devices have attempted to account for indoor ambient light levels and adjust the display accordingly but these devices have not performed adequately (especially when used in direct sunlight). When used in outdoor and/or direct sunlight environments, the issue of ambient light and the adjustments for ambient light become even more important. Not only is an adjustable system important for optimizing the image produced by the display, but energy consumption by large, bright displays has also become a major concern. It is now desirable to limit the energy consumption of electronic displays by dimming them when the ambient conditions are very dark and using the brightest (most energy-draining) settings only when the ambient light is very high. It is desirable not only to meet these minimum and maximum settings, but also adjust for all ambient light levels in between.

LCDs typically contain a liquid crystal stack which typically comprises several layers including two transparent plates which sandwich liquid crystal material in-between, front and rear polarizers, and an electrically conductive layer. The liquid crystal stack is usually semi-transparent and requires a backlight in order to properly filter the light and create an image. The power levels sent to the backlight can be measured by a circuit in an attempt to determine the illumination level of the backlight. However, for several reasons, it has been found that the actual illumination of the backlight does not always correlate with the power level being sent to the backlight. Thus, light sensors have typically been placed within the backlight in order to measure its level of luminance. However, when used in outdoor environments, the ambient light (sometimes sunlight but can also be headlights, streetlamps, signs, reflections of any of these, or other sources of ambient light) can sometimes penetrate the liquid crystal stack and interfere with the light sensor placed in the backlight assembly.

Thus, there is a need for a system and method to calibrate the backlights for electronic displays that may be subjected to a wide range of ambient light levels.

SUMMARY OF THE EXEMPLARY EMBODIMENTS

Exemplary embodiments include a system and method for calibrating and/or adjusting the backlight levels for a display based on light sensor data. An exemplary system contains a light sensor assembly within the backlight cavity of the display as well as a light sensor assembly placed to detect the ambient light levels. The sensors as well as the circuit for powering the backlight assembly may be calibrated to improve the accuracy of the system.

Some sources of backlighting degrade over time. For example, LED's may degrade over time and emit less light. Exemplary embodiments also allow for the brightness of a display to adjust based on the degradation of the light source.

Also for indoor applications, the temperature that an electronic display is subjected to will also vary only a small amount. Typically, these displays only see a range of temperatures near room temperature (ex. 65-75 degrees Fahrenheit). However, for outdoor applications, displays will see a very wide range of temperatures. These displays may see temperatures ranging from well below freezing to well over 100 degrees Fahrenheit. It is known that the properties of the light from LEDs may vary as the temperature of the LED varies. Thus, an exemplary embodiment also accounts for changes in temperature of the LEDs in the backlight assembly.

Exemplary embodiments of the system and method can be used not only for dynamic LCD displays, but can also be used for static backlit displays. A typical static backlit display may provide a still image which is backlit using a backlighting assembly.

The foregoing and other features and advantages of the exemplary embodiments will be apparent from the following more detailed description of the particular embodiments, as illustrated in the accompanying drawings.

BRIEF DESCRIPTION OF THE DRAWINGS

A better understanding of an exemplary embodiment will be obtained from a reading of the following detailed description and the accompanying drawings wherein identical reference characters refer to identical parts and in which.

DETAILED DESCRIPTION

Figure 1:
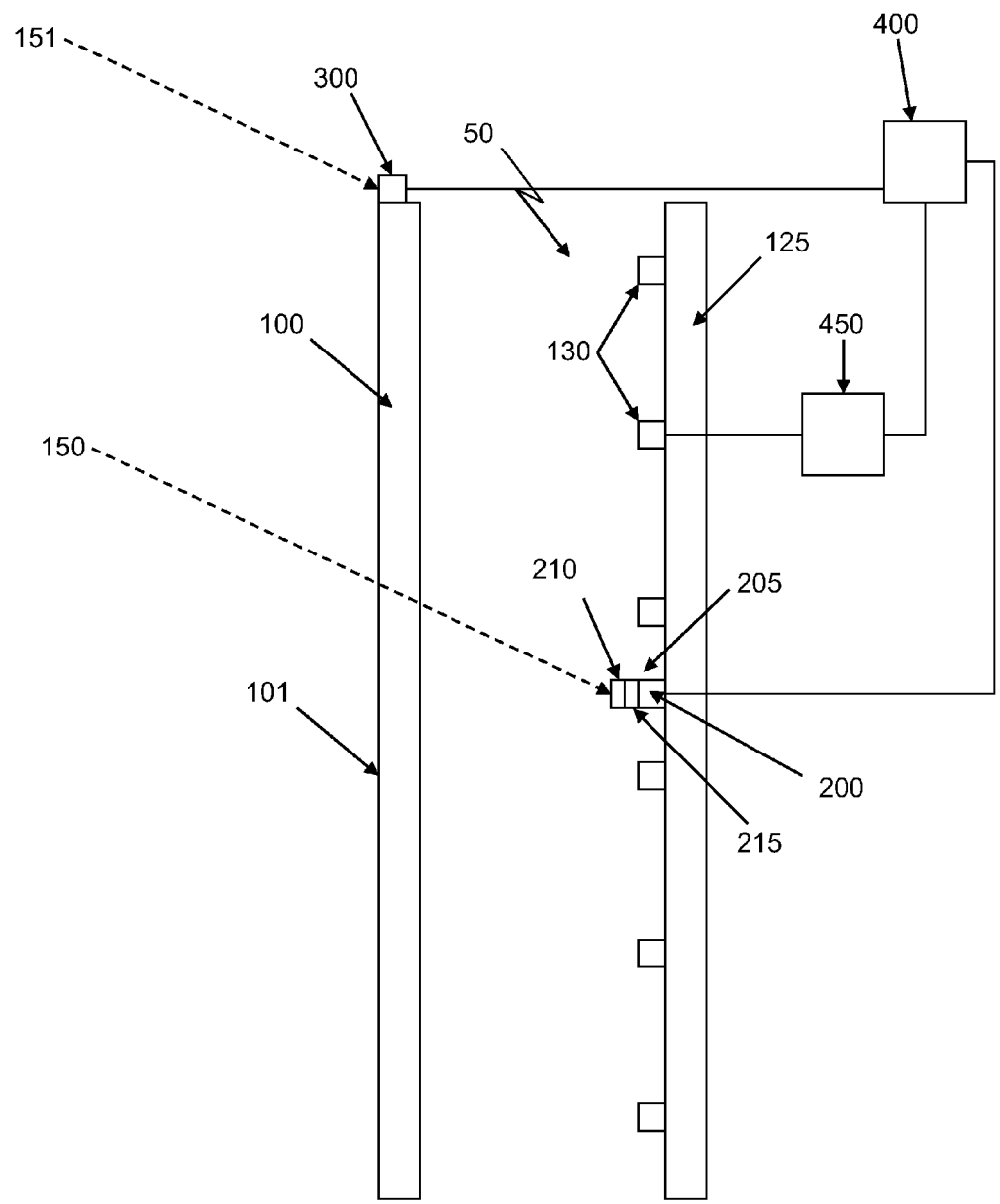
FIG. 1 is a side view of an exemplary system used with an LCD.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 provides a side view of an exemplary system 50 used with an LCD. A backlight assembly 125 may be placed behind an LCD stack 100. A plurality of LEDs 130 may be placed on the front on the backlight assembly 125 to provide backlight illumination through the LCD stack 100. A light sensor assembly 205 may be placed within the backlight cavity in order to measure one or more properties of the illumination from the backlight assembly 125. The light sensor assembly 205 may comprise several components. A light sensing device 200 may be used. An exemplary light sensing device 200 may be a photometer. As shown in the figure, ambient light 150 may penetrate into the display, through the LCD stack 100, and interact with the light sensor assembly 205. This interaction may be undesirable if attempting to measure the backlight illumination, as the ambient light 150 may cause improper readings (i.e. high light levels may be measured while the backlight is actually running at a low level).

As mentioned above, it may be necessary to run the backlight at very high levels in order to overcome large amounts of ambient illumination (i.e. direct sunlight). Thus, some of the exemplary backlights can produce 700-1000 nits or more of illumination. At times, these high levels can oversaturate the light sensing device 200 and compromise the accuracy of the measurement device. It has been discovered that this phenomenon can be counteracted by placing a translucent structure 210 between the light sensing device 200 and the LCD stack 100. The translucent structure 210 may be utilized in order to attenuate the high levels of light being generated by the LEDs 130 as well as the ambient light 150 that passes through the LCD stack 100. In a preferable embodiment, the translucent structure 210 would attenuate between 80% and 98% of the incoming light rays.

In an exemplary embodiment the translucent structure 210 would also be highly reflective so that the translucent structure 210 (and light sensing device 200) would not create a potentially noticeable 'dark spot' in the backlight assembly 125. One type of translucent structure would be a polyester film. Some embodiments may use a 'white' colored translucent structure to provide its reflective properties. Exemplary embodiments may use Lumirror® products from Toray Plastics (America), Inc. of North Kingstown, R.I. www.torayfilms.com Some embodiments may utilize a layer of pressure sensitive adhesive (PSA) 215 to attach the translucent structure 210 to the light sensing device 200. Other optical adhesives can also be used.

Exemplary embodiments may also use an ambient light sensing device 300 for measuring one or more properties of the ambient light 151 which may contact the front display surface 101 (the surface through which the image light rays exit the LCD stack 100). Depending on the application environment as well as the specific type of ambient light sensing device 300 being used, a translucent structure or filter of some type may be placed on the front of the light sensing device 300 also to attenuate any high ambient light levels. This translucent structure or filter may be attached to the light sensing device 300 with pressure sensitive adhesive. Again, an exemplary light sensing device may be a photometer. There are many types of photometers commonly available, and any number of these could be used with the embodiments herein.

The light sensing devices 300 and 200 are preferably in electrical communication with a software driver or microprocessor 400, which may be adapted to run the operations described below. The software driver or microprocessor 400 may also be in electrical communication with a power source 450 which sends power to the LEDs 130. There are many types of software drivers and/or microprocessors which can be used with the exemplary embodiments described herein. Any device which can accept data from the light sensing devices and operate any of the logic commands described herein would be acceptable.

Figure 2:
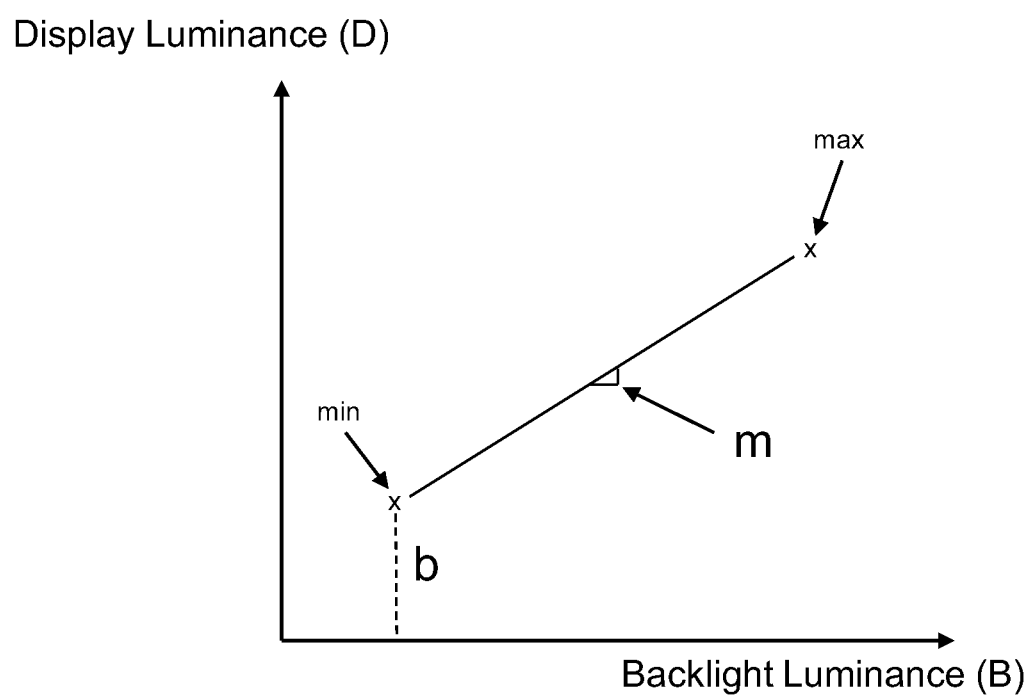
FIG. 2 is a graphical representation of one type of relationship between the Backlight Luminance (B) and the Display Luminance (D).

FIG. 2 is a graphical representation for one type of relationship between the Backlight Luminance (B) and the Display Luminance (D). Here a linear relationship may be derived between the display luminance (D) and the backlight luminance (B). As is known in the art, the amount of luminance generated within the backlight cavity typically decreases as it passes through the liquid crystal stack. Therefore, luminance measurements within the backlight cavity do not always correlate with the actual display luminance. By using the relationship shown in FIG. 2, the system can be calibrated so that the luminance of the display can be more accurately controlled.

The relationship may be represented by: D=mB+b. Here, 'D' is the desired display luminance output (amount of light exiting the display, after passing through the liquid crystal stack; sometimes measured in nits); 'B' is the backlight luminance output (amount of light within the backlight cavity; sometimes measured in nits), 'm' is the slope of the approximated linear relationship between 'B' and 'D'; and 'b' is the calibration factor. Thus, the display luminance (D) can be represented as a function of the backlight luminance (B).

Initially, two data points for the display luminance may be selected, min and max ($D_{min}$ and $D_{max}$). The 'max' point may represent the maximum luminance that would be desired from the display (i.e. daytime operations in direct sunlight). The 'min' point may represent the minimum luminance that would be desired from the display (i.e. nighttime operations or very dark conditions). Each of the two points may be selected based on many factors, including the desired environment for the display, power consumption requirements, what type of material will be shown on the display, etc. For example and not by way of limitation, $D_{min}$ may be 200 nits and $D_{max}$ may be 800 nits. At the start of the calibration process, the power levels sent to the backlight may be increased until the desired luminance levels ($D_{min}$ and $D_{max}$) have been reached. The corresponding backlight illumination levels which produce the desired $D_{min}$ and $D_{max}$ may then be recorded ($B_{min}$ and $B_{max}$).

In the particular embodiment shown in FIG. 2, a linear relationship is used. Thus, given the max/min values above, 'm' and 'b' can then be calculated and stored. Now, the linear relationship of D=mB+b can be used to derive the necessary backlight illumination levels (B) for any desired display luminance (D). As discussed immediately below, the desired display luminance (D) is typically dependant from the amount of ambient light.

Of course, in some applications a linear relationship may not be the best approximation for the relationship between the backlight luminance and the display luminance. In those situations it may be desirable to create several data points and then fit them into a polynomial or exponential function. Alternatively, many data points can be taken and stored as a look-up table instead.

Figure 3:
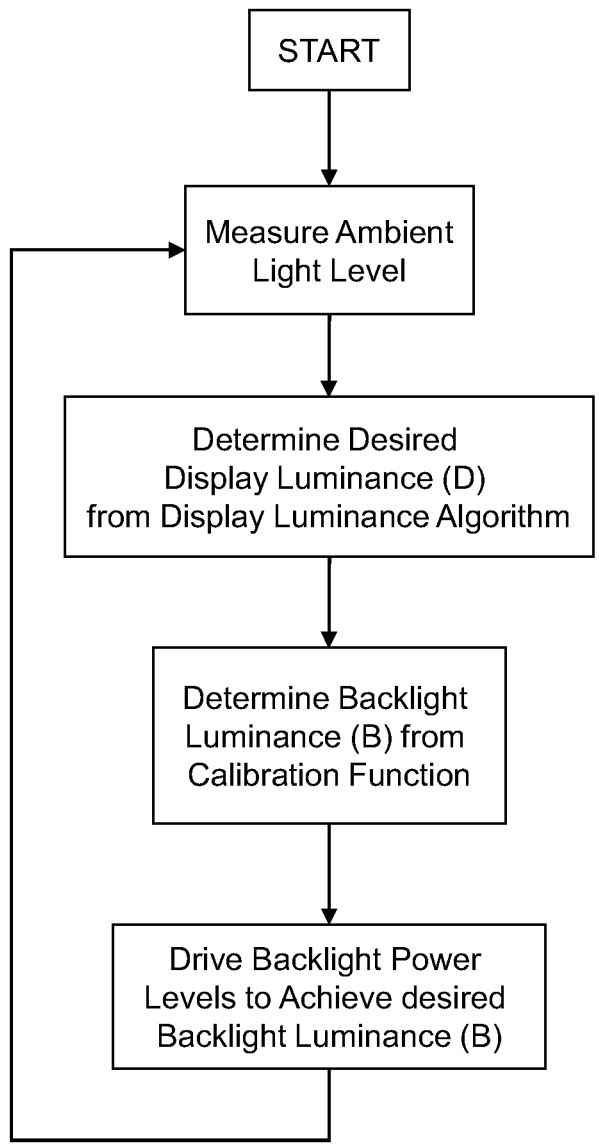
FIG. 3 is a flow chart of an exemplary embodiment for the logic for calibrating and adjusting the backlight based on the amount of ambient light.

FIG. 3 shows an exemplary embodiment for the logic (possibly contained within a software driver or microprocessor) for adjusting the backlight based on the amount of ambient light. By using any preferred Desired Display Luminance Algorithm, a desired display luminance (D) can be calculated based on the level of ambient light. There are many different Desired Display Luminance Algorithms that could be used with the various embodiments herein. In a basic embodiment, a desired light ratio can be determined which compares the amount of light in the ambient surroundings with the amount of light being generated by the display. For most applications, the amount of display luminance will need to be greater than the amount of ambient light to ensure that the display can be seen. Preferably, the ratio of ambient light to display light should be less than one. (ex. Desired Light Ratio=ambient light/display light). However, the precise light ratio can vary depending on the particular display, environment, and application. Once a desired light ratio is selected, it may be stored within a software driver and when given the input data from the ambient light sensor, the desired display luminance (D) can be calculated. The desired light ratio may have an acceptable range, such that there is a certain amount of tolerance which allows the calculated ratio during operation to drift a certain amount above or below the desired light ratio, before any action is taken by the system.

In a more advanced embodiment, the Desired Display Luminance Algorithm may comprise a function which takes into account the response of the human eye (which is known to be generally logarithmic) and may be adjustable by the user depending upon the display application and performance levels. One example of this would be the following equation:

Display Luminance $(D)$=Min Brightness$*F^{(N-1)}$

Where:

$$F = \text{Dimming Ratio}^{\frac{1}{N-1}}$$

Dimming Ratio=(Max Brightness)/(Min Brightness)

Max Brightness=Maximum display brightness (Adjustable)

Min Brightness=

Display brightness in minimal ambient conditions (Adjustable)

N=Number of steps in the desired brightness table

High Ambient=parameter that corresponds to the amount of detected ambient light at which the display should be driven at Max Brightness (Adjustable)

Step=High Ambient/N

With these expressions, a look-up table may be generated where a number of ordered pairs (Ambient Light, Display Luminance (D)) are generated for later retrieval by the system logic. By way of example and not by limitation, assume N=256, High Ambient=2560, Min Brightness=200, and Max Brightness=800. Thus, the table would resemble:

1 (0, 200)

2 (10, 201)

. . .

256 (2560, 800)

Therefore, for this embodiment, when given an amount of Ambient Light (0 to High Ambient 2560), the table can be accessed and a corresponding Display Luminance can be extracted. For ambient light measurements that fall in between the Step amounts (in this example the step is 10), the closest step amount may be selected from the table or an interpolation calculation may be ran to find the desirable display luminance based on the surrounding steps and their corresponding display luminances. In this scenario, any amount of Ambient Light above 2560 would simply result in Max Brightness. Alternatively, rather than using the ordered pairs as a look-up table, they could be fitted to a curve (ex. Polynomial curve) and this curve could be used as a running calculation (when given an amount of Ambient Light, the corresponding Display Luminance (D) can be calculated). As noted above, some of the parameters are adjustable to fit the end-user's requirements and/or specific application.

Referring back to FIG. 3, the software driver (or appropriate microprocessor) may read the data from the ambient light sensor 300 and, using any preferred Desired Display Luminance Algorithm, calculate the desired display luminance (D). Then, using the calibration relationship from FIG. 2, the amount of backlight luminance (B) which corresponds to the desired display luminance (D) may be calculated. By using a feedback loop with the light sensor assembly 205, the power levels sent to the backlight may be adjusted until the desired backlight luminance (B) is observed by the light sensor assembly 205.

Figure 4:
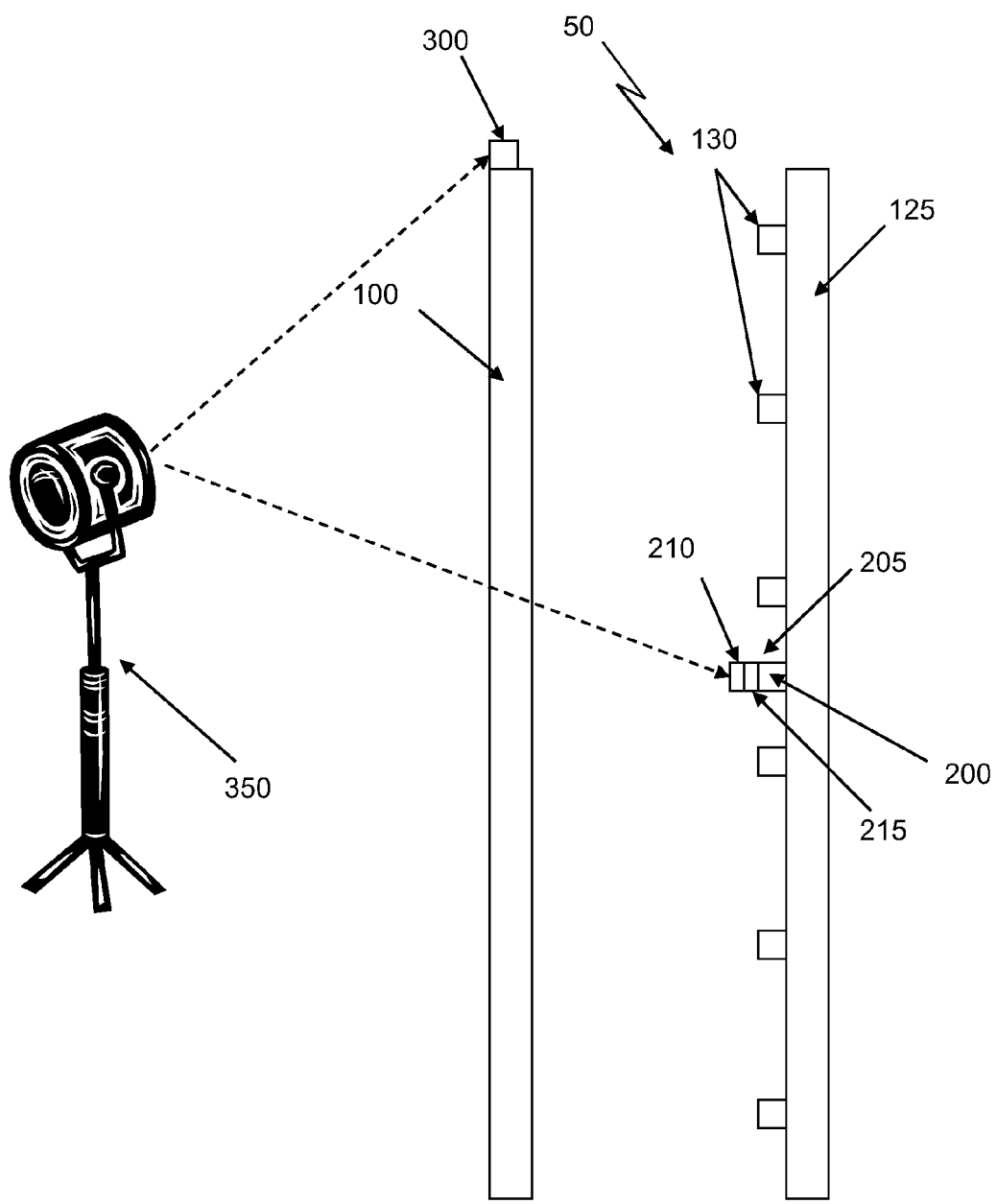
FIG. 4 is a side view of one embodiment for a setup designed to calibrate the use of the ambient light sensing device as a correction to the light sensing device in the backlight cavity.

FIG. 4 shows one embodiment for a setup designed to calibrate the use of the ambient light sensing device 300 as a filter/adjustment for the ambient light entering the backlight cavity and disrupting the measurements of the light sensing device 200. As one can readily observe given the description above, if ambient light penetrates into the display backlight it may contact the light sensing device 200 and cause the system to 'think' that the backlight is operating at a very high level when in actuality the backlight could be dimmer than the actual measurement. This is undesirable as it could cause the backlight to be powered at a less-than-desired brightness and may cause the overall display to appear dim or 'washed out' by the high levels of ambient light. A light source 350 may be used to simulate the high ambient light levels found in many outdoor environments. It is preferable that the light source 350 is capable of adjusting the luminance output so that high and low ambient light levels could be simulated. Alternatively, the light source 350 may be moved closer/farther from the LCD stack 100 to simulated higher/lower ambient light levels. Ideally, the light source 350 is placed so that its illumination is directed towards the ambient light sensing device 300 as well as into the LCD stack 100.

Figure 5:
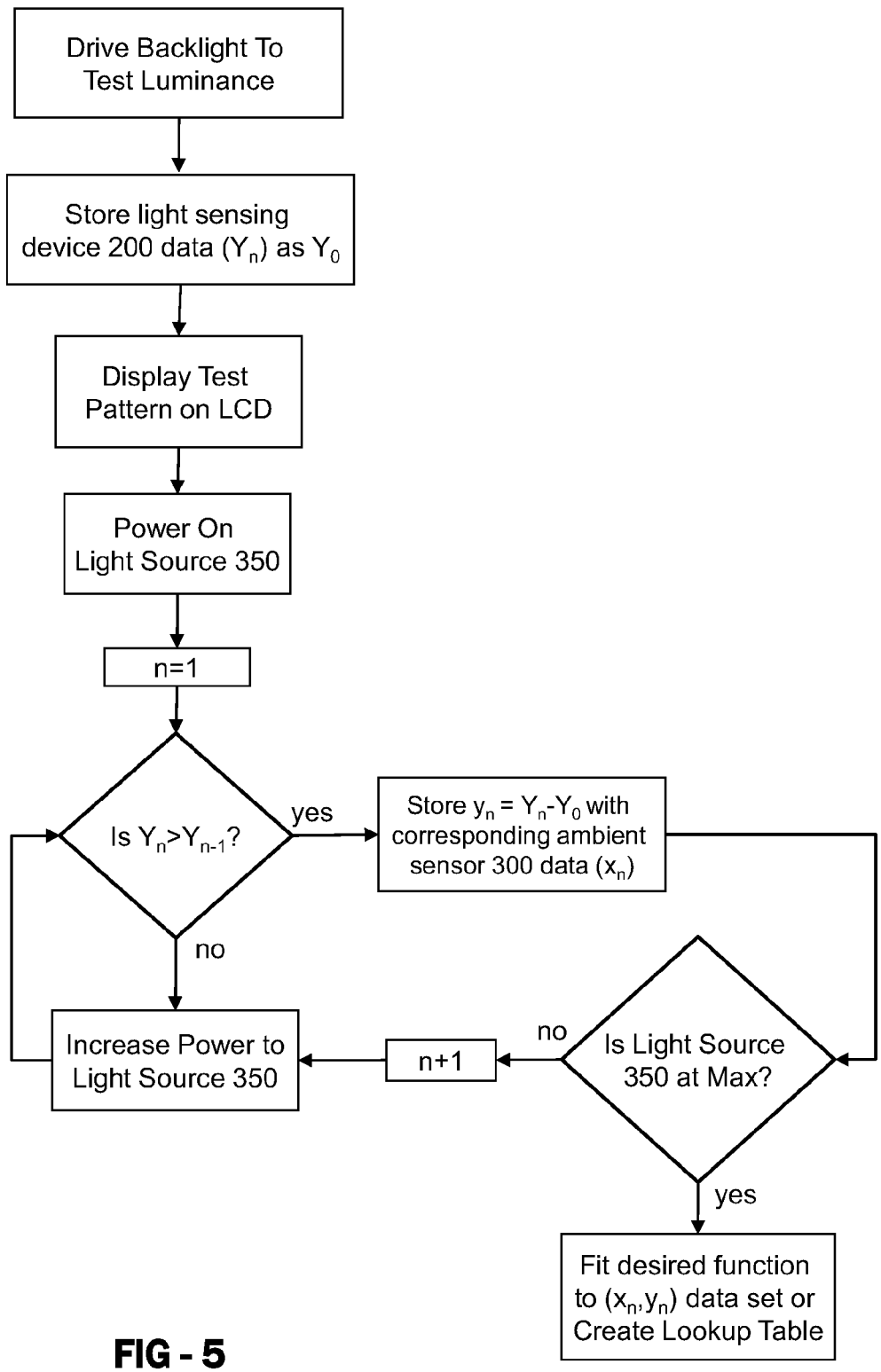
FIG. 5 is a flowchart for producing the correction factors for the light sensing device in the backlight cavity.

FIG. 5 provides a flowchart for the calibration process for using the ambient light sensing device 300 as a filter/adjustment for the ambient light entering the backlight cavity and disrupting the light sensing device 200. Initially, the backlight should be driven to a test luminance (which could be any desired backlight luminance level). Ideally, because this filter/adjustment system is designed for when there is a large amount of ambient light, it is preferable that the test luminance should be high, even more preferably it would be near or equal to the maximum luminance setting for the backlight. The test luminance may be a constant luminance or may vary. Herein, the data which is read from light sensing device 200 will be represented as $Y_n$. The initial data from the light sensing device 200 once the backlight is driven at the test luminance may be stored as $Y_0$.

As is known in the art, the liquid crystals in the LCD stack 100 block certain amounts of light in order to create an image. Thus, the ambient light that is passing through the LCD stack 100 and into the backlight cavity is going to be affected by the type of image or video being shown on the LCD stack. Thus, some type of display test pattern should preferably be shown on the LCD stack 100 during this calibration process. The precise test image/pattern may be selected based on the end-use of the display. In an exemplary embodiment, the display may cycle through full screens of red, green, blue, and white and the system may use the average value read from the light sensing device 200 and store this as $Y_n$. Other embodiments may simply use a white screen as the test pattern as the color white typically allows the maximum amount of light penetration through the LCD stack 100.

The light source 350 may be powered on at a relatively low level (or at a distance relatively far from the LCD stack 100 if using a light source 350 that does not have adjustable luminance output). Preferably, when the light source 350 is first powered there is no measurable penetration into the backlight cavity because it may be desirable to find the lowest ambient light level that disrupts the light sensing device 200. If, upon first power up the light source 350 is already disrupting the light sensing device 200, then the lowest value has not been found and the power to the light source 350 should be decreased (or the distance from the LCD stack 100 increased).

Preferably, upon the initial power up of light source 350 there will be no noticeable difference in the data $Y_n$ from the light sensing device 200. Thus, to obtain the first data point, the power to the light source 350 should be increased until the measurement from the light sensing device 200 is now greater than the initial value (i.e. $Y_1 > Y_0$). It is at this point that the ambient light levels are now affecting the luminance in the backlight and the data for the ambient light sensing device 300 should be recorded as $x_1$ (ambient light threshold). This ambient light threshold may represent the point at which the amount of ambient light (measured by the ambient light sensing device 300) is high enough to affect the measurements of the light sensing device 200 in the backlight cavity. Also, the difference between the initial data $Y_0$ and the current data $Y_1$ should be calculated and stored as $y_n = Y_n - Y_0$. This calculated value $y_n$ may be referred to as a 'correction factor' or 'offset' for the light sensing device 200 because we now know that even though the light sensing device 200 is showing $Y_1$, the backlight is actually producing $Y_0$. Here, the first correction factor $y_1 = Y_1 - Y_0$. Here, the first ordered pair may be stored as $(x_1, y_1)$.

The power to the light source 350 should now be increased in order to collect another data point. Once the increase in the light source 350 becomes adequately measurable by the light sensing device 200 (i.e. $Y_2 > Y_1$), the data from the ambient light sensing device 300 should be stored as $x_2$ and the calculation $y_2 = Y_2 - Y_0$ is completed and $y_2$ is stored. Now, the second ordered pair may be stored as $(x_2, y_2)$. This process may be repeated and data may be collected until the maximum desired output for the light source 350 has been reached. The measurable increase in $Y_n$ can be selected in any manner, i.e. the steps in the data may be small or large ones, depending on the user preferences. During calibration, any number of data points can be taken depending on the particular system. In some embodiments, only a few data points may be taken while in other embodiments there may be a large number of data points taken. The maximum desired output for the light source 350 could be selected for a number of reasons. It may be the maximum anticipated amount of ambient light that this display will be exposed to. It could also simply be the maximum amount of light that can be generated by the light source 350.

The data set of $(x_n, y_n)$ could then be fit to a desired curve so that for any observable data from the ambient light sensing device 300 ($x_n$) the system can derive the corresponding offset for the data coming from the backlight sensing device 200 ($y_n$). The curve could be any number polynomial or exponential function and could be developed by using interpolation or smoothing or may simply use a linear relationship between the max/min data points. Alternatively, the data set $(x_n, y_n)$ could be used as a look-up table instead of being fit with a curve.

Figure 6:
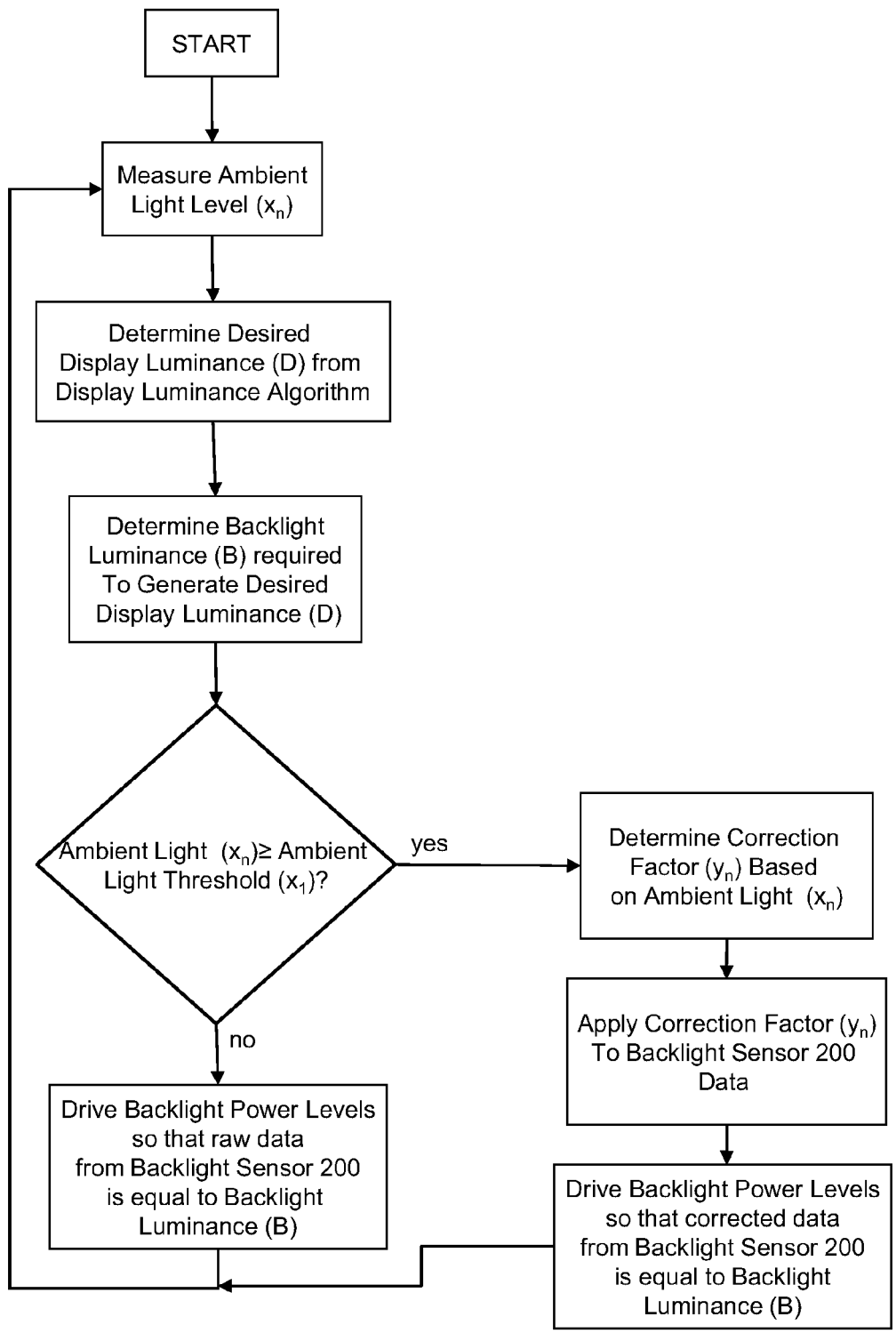
FIG. 6 is a flow chart for one example of the logic for how the correction factors could be used in operation of the display.

With the stored correction values $y_n$ or a function that could calculate the appropriate correction value $y_n$, the system can get a closer approximation of what the true luminance values for the backlight are when ambient light levels are high. FIG. 6 provides one example of how these correction factors could be used in operation of the display. The process is similar to the one shown in FIG. 3, with the notable addition of applying the correction factor to the data coming from the light sensing device 200. Initially, the ambient light level ($x_n$) is measured using the ambient light sensing device 300. Based on the amount of ambient light, a desired display luminance (D) can be selected based on the desired Display Luminance Algorithm (discussed above in view of FIG. 3). A required backlight luminance level (B) can then be calculated based on the desired display luminance (D) (this process was discussed above in view of FIG. 2).

At this point, the measurement from the ambient light sensing device 300 can be compared to the ambient light threshold ($x_1$). If the current level of ambient light is greater than (or equal to) the ambient light threshold, the correction factor for this amount of ambient light may be determined based on the function or lookup table created in FIG. 5. The correction factor ($y_n$) may then be applied to the data from the light sensing device 200. In some embodiments, the correction factor ($y_n$) may be applied by subtracting it from the raw data coming from the light sensing device 200. The application of the correction factor to the raw data coming from the light sensing device 200 produces corrected data for light sensing device 200. The corrected data is now the target value for the software driver 400/power source 450/light sensing device 200 feedback loop. In other words, the software driver 400 should control the power source 450 such that the corrected data from light sensing device 200 is equal to (or within a certain threshold of acceptance to) the Backlight Luminance (B).

Alternatively, if the current level of ambient light ($x_n$) is less than the ambient light threshold ($x_1$), then the system may use the raw data from the light sensing device 200 without the correction factor. Thus, the software driver 400 should control the power source 450 such that the raw data from light sensing device 200 is equal to (or within a certain threshold of acceptance to) the Backlight Luminance (B).

The system would then re-measure the ambient light level and start the logic process again. The system could hold the previous backlight power setting for a certain amount of time prior to re-measuring the ambient light levels or the system may immediately return to measure the ambient light and make constant adjustments. Given the very fast response times of microprocessors/software drivers, LEDs, and the associated circuitry, constant monitoring and adjustment is possible.

Having shown and described exemplary embodiments of the invention, those skilled in the art will realize that many variations and modifications may be made to affect the described embodiments and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

The invention claimed is:

1. A system for controlling the backlight luminance of a liquid crystal display (LCD) having a front display surface, a plurality of LEDs placed within a backlight cavity, and a LCD stack between the front display surface and the backlight cavity, the system comprising:
a first light sensing device placed to measure the ambient light contacting the front display surface;
a second light sensing device placed within the backlight cavity and positioned to measure at least the ambient light which is passing through the LCD stack and entering the backlight cavity;
a power source in electrical communication with the LEDs; and
a software driver in electrical communication with the first light sensing device, second light sensing device, and power source.

2. The system of claim 1 further comprising:
a translucent structure placed between the second light sensing device and the LCD stack.

3. The system of claim 2 further comprising:
a layer of pressure sensitive adhesive between the translucent structure and the second light sensing device.

4. The system of claim 1 wherein:
the software driver is adapted to
apply a correction factor to the data from the second light sensing device based on data from the first light sensing device and
drive the power source according to corrected data from the first light sensing device.

5. The system of claim 2 wherein:
the translucent structure is a polyester film.

6. The system of claim 2 wherein:
the translucent structure is white.

7. The system of claim 1 wherein:
the first and second light sensing devices are photometers.

8. The system of claim 1 further comprising:
a translucent structure placed in front of the first light sensing device.

9. The system of claim 8 further comprising:
a layer of pressure sensitive adhesive placed between the translucent structure and the first light sensing device.

10. A method for controlling the backlight of a liquid crystal display (LCD) having a front display surface, a plurality of LEDs placed within a backlight cavity, a LCD stack between the front display surface and the backlight cavity, a first light sensing device placed to measure the ambient light contacting the front display surface, a second light sensing device placed within the backlight cavity, a power source in electrical communication with the LEDs, and a software driver in electrical communication with the first light sensing device, second light sensing device, and power source, the method comprising:
accepting the ambient light data from the first light sensing device;
determining the desired display luminance based on the ambient light data;
determining the desired backlight luminance based on the desired display luminance; and
driving the LEDs to achieve the desired backlight luminance according to the light data from the second light sensing device.

11. The method of claim 10 wherein the step of determining the desired display luminance comprises the steps of:
utilizing a desired light ratio of ambient light to display luminance; and
calculating the desired display luminance based on the ambient light data from the first light sensing device and the desired light ratio.

12. The method of claim 10 wherein the step of determining the desired display luminance comprises:
utilizing a non-linear relationship between the ambient light data and display luminance;
utilizing a look-up table containing values for the ambient light data with corresponding desired display luminance values; and
accessing the look-up table for a given ambient light data value to determine the desired display luminance.

13. The method of claim 10 wherein the step of determining the desired display luminance comprises:
utilizing a polynomial function as the relationship between the ambient light data and display luminance; and
calculating the desired display luminance from the polynomial function based on the ambient light data.

14. The method of claim 10 wherein the step of determining the desired display luminance comprises:

utilizing a logarithmic function as the relationship between the ambient light data and display luminance; and calculating the desired display luminance from the polynomial function based on the ambient light data.

15. The method of claim 10 further comprising:

determining a correction factor for the light data from the second light sensing device based on high values for the ambient light data from the first light sensing device;

applying the correction factor to the light data from the second light sensing device to produce corrected data; and driving the LEDs to achieve the desired backlight luminance according to the corrected data from the second light sensing device.

16. The method of claim 15 wherein the step of determining a correction factor for the light data from the second light sensing device comprises the steps of:

A. driving the backlight to a constant test luminance;
B. storing the light data from the second light sensing device as $Y_o$;
C. displaying a test pattern on the LCD;
D. operating a light source to direct light towards the first and second light sensing devices at a first intensity;
E. measuring the data ($Y_n$) from the second light sensing device;
F. measuring the data ($x_n$) from the first light sensing device;
G. increasing the intensity of the light source until there is an adequate difference between $Y_o$ and $Y_n$ and calculating the correction factor ($y_n$) as $Y_n31 Y_o$;
H. storing the pair ($x_n$, $y_n$); and
I. repeating steps (G) and (H) for all n.

17. A system for controlling the backlight luminance of a liquid crystal display (LCD) having a front display surface, a plurality of LEDs placed within a backlight cavity, and a LCD stack between the front display surface and the backlight cavity, the system comprising:

a first light sensing device placed to measure the ambient light contacting the front display surface;

a second light sensing device placed within the backlight cavity and positioned to measure at least the ambient light which is passing through the LCD stack and entering the backlight cavity;

a translucent structure placed in front of the first light sensing device;

a power source in electrical communication with the LEDs; and a microprocessor in electrical communication with the first light sensing device, second light sensing device, and power source and adapted to apply a correction factor to the data from the second light sensing device based on data from the first light sensing device and drive the power source according to corrected data from the first light sensing device.

18. The system of claim 17 further comprising:

a layer of pressure sensitive adhesive placed between the translucent structure and the first light sensing device.

19. The system of claim 17 wherein the microprocessor is further adapted to:

accept the ambient light data from the first light sensing device;

determine the desired display luminance based on the ambient light data;

determine the desired backlight luminance based on the desired display luminance; and drive the power supply to achieve the desired backlight luminance according to the light data from the second light sensing device.

20. A system for controlling the backlight luminance of a liquid crystal display (LCD) having a front display surface, a plurality of LEDs placed within a backlight cavity, and a LCD stack between the front display surface and the backlight cavity, the system comprising:

a first light sensing device placed to measure the ambient light contacting the front display surface;

a second light sensing device placed within the backlight cavity;

a power source in electrical communication with the LEDs; and a microprocessor in electrical communication with the first light sensing device, second light sensing device, and power source and adapted to apply a correction factor to data from the second light sensing device based on the amount of ambient light passing through the LCD stack and entering the backlight cavity.

\* \* \* \* \*